J. L. CREVELING.
ELECTRIC REGULATION.
APPLICATION FILED MAR. 14, 1916.
1,348,348.
Patented Aug. 3, 1920.
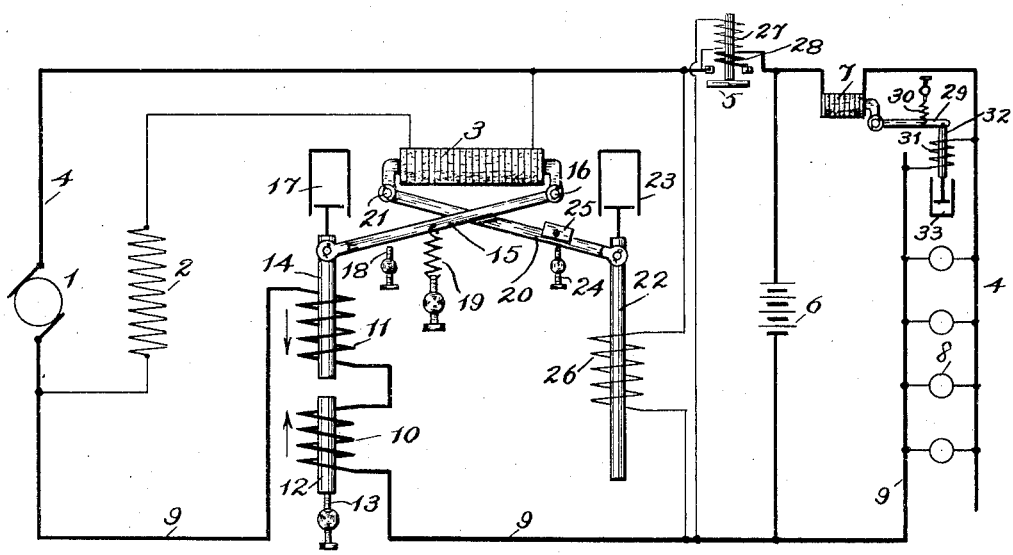
Fig. I.
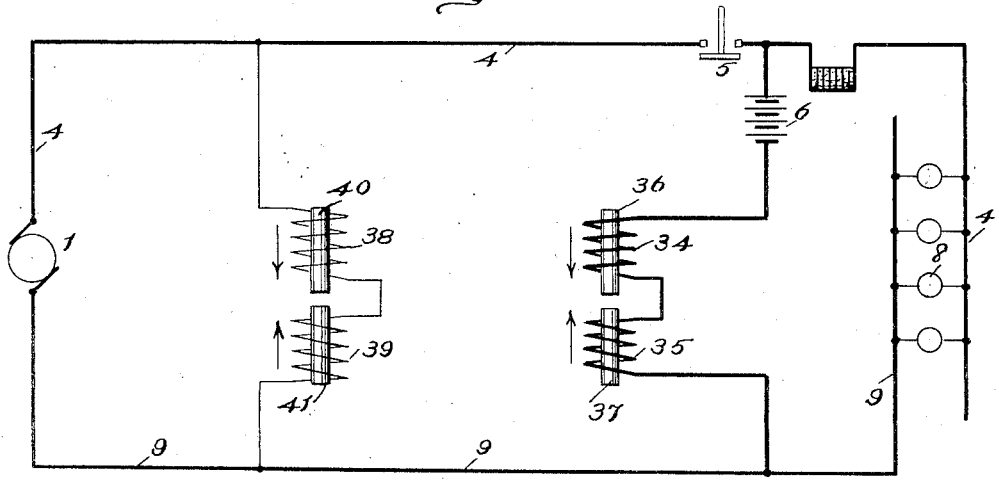
Fig. II.
INVENTOR:
John L. Creveling

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC REGULATION.

1,348,348.   Specification of Letters Patent.   Patented Aug. 3, 1920.

Application filed March 14, 1916. Serial No. 84,183.

*To all whom it may concern:*

Be it known that I, JOHN L. CREVELING, a citizen of the United States, residing at Tucson, Arizona, have invented certain new and useful Improvements in Electric Regulation, of which the following is a specification.

My invention pertains to the regulation of electrical functions, and has for a principal object to provide automatic means for so doing.

My invention is particularly applicable to electrical systems wherein a controllable source of electrical potential difference which may tend to vary is to be automatically controlled.

As my invention is particularly useful in such systems wherein the value of the potential difference at said source is apt to tend to vary from zero to even several times the desired maximum value, and wherein it is desired to employ a storage battery which shall be properly charged from said source, and wherein it is desired to supply translating devices requiring a substantially constant voltage, it will be described with reference to such a system. A system for lighting railway cars wherein a dynamo or generator driven from an axle of a car at variable speeds is used to charge a battery and supply the lamps which are maintained by the battery when the generator is ineffective, is such a system wherein my invention is very useful, and is therefore chosen for the description of an embodiment thereof.

In the drawing, Figure I is a diagrammatic representation of such a system showing one embodiment of my invention; and Fig. II is a diagrammatic representation of a portion of another type of such system, which will be explained with reference to Fig. I.

In Fig. I, 1 indicates a dynamo subject to speed changes and provided with a shunt field winding 2, having in series therewith a regulating element 3, indicated as a carbon pile rheostat, the operation of which may control the generator.

From the positive terminal of the generator, the wire 4 is carried to one terminal of a suitable automatic switch, such as illustrated, for example, at 5, from the remaining terminal of which the wire 4 continues to one side of any suitable voltage regulating device 7, in this instance indicated as of the usual carbon pile variety. The positive side of the storage battery 6 is connected with wire 4, between the switch 5 and regulating element 7. The wire 4 continues from the regulating element 7 to the positive terminals of the lamps or other translating devices 8, having their negative terminals in connection with the wire 9, which is in electrical communication with the negative side of the battery 6 and through coils 10 and 11, with the negative terminal of the generator 1.

Coil 10 surrounds a core of magnetic material 12, which may have its position adjusted as by means of screw 13, while coil 11 surrounds the movable core 14, pivotally connected with the longer end of the bell-crank lever 15, which may swing about its pivotal support 16 and thus vary the pressure upon the pile 3 and consequent resistance thereof. The coils 10 and 11 are so wound as to oppose each other. 17 is a dash-pot, restraining too sudden movement of the core 14, which gravity normally tends to lower so as to bring the lever 15 toward its adjustable stop 18. The force tending to cause such action may be adjusted, if desired, as for example by employing the adjustable spring 19. 20 is a bell-crank lever pivotally supported as at 21, and carrying at its longer extremity the core 22 of magnetic material, the weight of which tends to swing the lever 15 in such direction as to tend to compress the pile 3 and lower its resistance. The limit of travel that may be given the lever 20 in this direction may be adjusted as by screw or stop 24, and the pressure that may be applied to the pile 3 may be adjusted by employing a weight 25 which may have its position adjusted upon the lever 20. 23 is a dash-pot restraining too sudden movement of the core 22. 26 is a voltage responsive coil across the generator circuit and tending, when energized, to lift the core 22 and decrease the pressure upon the pile 3. 27 is a voltage responsive coil across the generator circuit adapted to close switch 5 when the voltage of the generator is substantially equal to that of the battery, while coil 28 is so wound and placed as to assist coil 27 in holding the switch 5 closed when current flows from the generator to the battery, and to oppose coil 26 and cause the switch to open upon back discharge from the battery.

The translating circuit regulating element or pile 7 may have its resistance varied by movement of lever 29, which is normally drawn upwardly by adjustable spring 30, and carries the core of magnetic material 32, surrounded by voltage responsive coil 31, across the translating circuit, which, when energized, tends to draw core 32 downwardly, while too sudden movement is resisted by dash-pot 33.

In Fig. II, like numerals indicate like parts, and there are shown only such portions of the system of Fig. I, common to both, as are thought necessary to explain the system of Fig. II, the other like or equivalent parts being omitted for sake of clearness and to avoid mere repetition.

In Fig. II the opposed current responsive coils 34 and 35 are shown in series with the battery circuit only, instead of the main circuit, as are coils 10 and 11 of Fig. I; and in Fig. II there are shown two opposed voltage responsive coils 38 and 39 instead of the single voltage responsive coil 26, as in Fig. I. In Fig. II the voltage responsive coils are shown on the left-hand side, and the current responsive coils on the right-hand side, or in the reverse of the position of the corresponding coils in Fig. I, to indicate that the relative positions may be chosen at will, without departing in any way from my invention; and in Fig. I mixed forms of adjustments for controlling the pressure upon the piles 3 and 7 are shown to indicate that any suitable adjustment, or adjusting means, is included in my invention. The different types of dash-pots usually employed in such systems are shown diagrammatically at 17, 23 and 33, to indicate that any type of retarding means may be used, as my invention comprehends broadly the full range of equivalents for any of the instrumentalities shown merely to portray embodiments thereof.

An operation of my invention is substantially as follows:

Referring to Fig. I, if the generator be still, or running below critical speed, the switch 5 will be open and the translating devices 8 may be supplied by the storage battery 6 through the regulating element 7, and I so adjust the spring 30 that solenoid 31 will, by controlling the pressure upon the pile 7, hold the desired translating circuit voltage from being appreciably exceeded in a well known manner.

If the generator have its voltage increased, as by an increase in speed, until substantially equal to that of the battery, switch 5 will close, and then, if the generator voltage be sufficient, it will supply current both to the translating devices and to the storage battery, through wire 4, and return will be made to the generator through wire 9, having in series therewith the coils 10 and 11.

The coil 31 and the coöperating mechanism affecting the element 7 will continue to hold the translating voltage substantially constant, even though the generator voltage be quite appreciably increased, as may be necessary to properly charge the battery. There is, however, a maximum voltage which it is desirable a generator shall not exceed, and which in this type of system is usually chosen substantially the same as the voltage of the storage battery when very nearly or fully charged, for, with such a value as a maximum voltage and an ordinary storage battery, possessed of the usual inherent characteristic of a more or less sudden rise in voltage at the approach of a fully charged state, the charging current will fall off and approach zero as the battery becomes fully charged.

I therefore so arrange and adjust the voltage responsive coil 26 that when this maximum voltage is reached, any further tendency toward increase in voltage will cause the said coil to raise the core 22 evenly against the effect of the dash-pot 23 and raise the lever 20 in such manner as to lessen the pressure upon the pile 3 and increase its resistance to cut down the exciting current in coil 2, and thus hold the generator voltage from exceeding this value, even upon wide increases in speed.

The coils 10 and 11 are so wound that the current flowing to the generator through the same sets up magneto-motive forces in opposed directions, as indicated by the arrows, or the reverse thereof. That is, the extremities of the cores 12 and 14 that are nearest each other are both north-seeking or both south-seeking poles. Therefore, the said cores repel each other when current is flowing in coils 10 and 11, and I so proportion said coils, and adjust the relation of the cores, as by moving the core 12 by means of screw 13, and so adjust the weight and arrangement of the movable core 14, resorting to springs as shown at 19, or equivalents if desired, that when the desired maximum current is reached in the generator circuit appreciable excess thereover will be prevented by the repulsion of core 14 in an upward direction, smoothly against the effect of dash-pot 17, in such manner as to raise lever 15 and lessen the pressure upon the pile 3 and control the generator field so as to tend to keep the current constant.

In the system indicated in Fig. II, the operation is substantially the same as above outlined, save that the battery circuit current is indicated as held from exceeding a desired value by the current responsive coils 34 and 35 in the battery circuit, instead of the main generator current, as in Fig. I, for it is within the scope of my invention to automatically control regulating functions in response to current fluctuations, in any desired circuit.

In Fig. II, the voltage regulating means is indicated as controlled by the repulsion effected by coils 38 and 39, which may act upon the cores 40 and 41 to cause them to mechanically control the resistance 3, in the same manner as did the series coils 10 and 11 with their cores 12 and 14. Or the repulsion effected by the voltage responsive coils 38 and 39, which may be connected across any circuit without departing from my invention, may in any other way operate to affect the regulating function, without departing from my invention, as my invention is not limited to any particular type of regulating element, or means for connecting the same with the repelling means, but is as set forth in the following claims:

1. Means for regulating an electric circuit comprehending a regulating element affecting said circuit, operating means for affecting said element, responsive means for affecting the operating means comprising a plurality of electromagnetic means in series with each other responding to fluctuations to be regulated and coöperating to cause repulsion of the operating means to increase the regulating effect of the regulating element.

2. Means for regulating an electric circuit comprehending a regulating element affecting said circuit, operating means for affecting said element, responsive means for affecting the operating means comprising a plurality of coils responding to fluctuations to be regulated and coöperating to cause repulsion of the operating means to increase the regulating effect of the regulating element.

3. Means for regulating an electric circuit comprehending a regulating element affecting said circuit, operating means for affecting said element, responsive means for affecting the operating means comprising a plurality of means responding to fluctuations to be regulated and coöperating to cause repulsion of the operating means in predetermined varying degrees to alter the effect upon the regulating element of like fluctuations in the responsive means under different conditions of the operating means.

4. Means for regulating an electric circuit comprehending a regulating element affecting said circuit, operating means for affecting said element, responsive means for affecting the operating means comprising a plurality of similarly affected coils responding to fluctuations to be regulated and coöperating to cause repulsion of the operating means to increase the regulating effect of the regulating element.

5. The combination with a dynamo and means for regulating the same, of means for affecting the regulating means comprehending a plurality of windings affected by the operation of the dynamo and means coöperating with said windings so disposed with respect thereto that repulsion of said means is always caused by energization of said windings and increases the resistance of said regulating means under predetermined conditions.

6. In an electrical system, a variable resistance for affecting the system, means for varying said resistance comprising a movable magnetizable member, means tending to move said member to decrease the resistance, and means for setting up opposed magnetic fluxes magnetically affecting said member to increase the resistance and responsive to a function to be governed.

7. The combination with a generator, a storage battery charged thereby, a variable resistance responsive to changes in pressure thereupon and affecting the operation of said generator, a current coil in series with at least a portion of the load of said generator and affected by changes in battery charging current, a voltage coil connected across a circuit supplied by said generator, the voltage of which varies upon certain changes in battery voltage, separate movable cores coacting with said coils, means mechanically coacting with said cores and tending to normally compress said medium and adapted upon one of said cores being repelled to weaken the pressure upon said medium, and means coacting with one of the above mentioned coils for causing repulsion of one of said cores responsive to an electrical function of the generator.

8. In an electrical system, a variable resistance for affecting the system, means for varying said resistance comprising a movable member, means tending to move said member to decrease the resistance, and means for setting up opposed magnetic fluxes magnetically affecting said member to increase the resistance and responsive to a function to be governed, and means for adjusting the decrement of the effect of said fluxes upon said member as the resistance is varied.

9. Means for regulating an electric circuit comprehending a regulating element affecting said circuit, operating means for affecting said element, responsive means for affecting the operating means comprising a plurality of similarly affected means responding to fluctuations to be regulated and coöperating to cause repulsion of the operating means in predetermined varying degrees to increase the regulating effect of the regulating element.

10. Means for regulating an electric circuit comprehending a regulating device and automatic responsive means for operating the same comprising a plurality of means magnetically repelling each other and adapted to cause motion by virtue of said repulsion and thus affect said device, the arrangement of said repelling means with respect to each other and to said device being such that the decrement of the repulsive action of the repelling means, due to motion caused thereby and affecting said device, causes the standard of the regulating action of said responsive means to be automatically varied in a desired manner as the regulating effect of said device is varied.

11. The combination with a storage battery, a source of variable voltage at times sufficient to charge said battery and automatic means responsive to electrical fluctuations of said source for connecting said battery with said source, of means for affecting said source comprehending actuating means responsive to effects produced by the source and having functionally varying degrees of actuating ability depending upon the operation thereof and possessing the greatest actuating ability at the time the automatic means connects the battery with said source.

12. The combinaion with a storage battery, a source of variable voltage at times sufficient to charge said battery and automatic means responsive to electrical fluctuations of said source for connecting said battery with said source, of means for affecting said source comprehending actuating means responsive to effects produced by the source and having functionally varying degrees of actuating ability depending upon the operation thereof and possessing the greatest actuating ability at the time the automatic means connects the battery with said source and which actuating ability diminishes in a predetermined functional manner as the effect of the means affecting the source increases.

13. The combination with a storage battery, a generator driven at different speeds and the voltage of which at times is sufficient and at other times insufficient to charge said battery and automatic means responsive to the electrical operation of said generator for connecting the battery with said generator to charge the battery and to disconnect the battery from said generator to prevent back discharge from the battery, of means for regulating the said generator comprehending actuating means responsive to the electrical operation of said generator and having functionally greater actuating ability under the conditions that the generator is first connected with the battery by the automatic means than during the normal charging period of the battery whereby the responsive means causes the generator to be regulated with greatest rapidity at such times as the same has its connection first established with the battery to compensate rapidly for electrical fluctuations due to difference in voltage between the generator and the battery.

JOHN L. CREVELING.